US012444372B2

(12) United States Patent
Kim et al.

(10) Patent No.: US 12,444,372 B2
(45) Date of Patent: Oct. 14, 2025

(54) DISPLAY DEVICE AND METHOD OF COMPENSATING IMAGE DATA

(71) Applicant: Samsung Display Co., Ltd., Yongin-si (KR)

(72) Inventors: Hyunchang Kim, Seoul (KR); Subin Kim, Suwon-si (KR); Se-Byung Chae, Seongnam-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 304 days.

(21) Appl. No.: 17/992,325

(22) Filed: Nov. 22, 2022

(65) Prior Publication Data

US 2023/0282174 A1 Sep. 7, 2023

(30) Foreign Application Priority Data

Mar. 4, 2022 (KR) ........................ 10-2022-0027980

(51) Int. Cl.
*G09G 5/10* (2006.01)
*G09G 3/3233* (2016.01)
*G09G 3/3291* (2016.01)

(52) U.S. Cl.
CPC ..... *G09G 3/3291* (2013.01); *G09G 2310/027* (2013.01); *G09G 2320/0242* (2013.01); *G09G 2320/0626* (2013.01)

(58) Field of Classification Search
CPC .. G09G 5/02; G09G 5/10; G09G 3/00; G09G 3/20; G09G 3/30; G09G 3/32; G09G 3/34; G09G 3/36; G09G 3/3208; G09G 3/3233; G09G 3/3291; G09G 3/3225; G09G 3/3266; G09G 3/3275; G09G 3/3258; G09G 2310/027; G09G 2320/0242; G09G 2320/0626
See application file for complete search history.

(56) References Cited

U.S. PATENT DOCUMENTS

2009/0147032 A1* 6/2009 Kim ..................... G09G 3/3225 345/76
2016/0267876 A1* 9/2016 Kim ......................... G09G 5/10
2018/0151117 A1* 5/2018 Choi .................... G09G 3/3225
2019/0347971 A1* 11/2019 Pyo ........................ G09G 3/006
2021/0049960 A1* 2/2021 Han ..................... G09G 3/3208
2021/0049966 A1* 2/2021 Hsu ...................... G09G 3/3258

FOREIGN PATENT DOCUMENTS

KR 1020110071938 A 6/2011
KR 1020180058245 A 6/2018
KR 1020200046753 A 5/2020

* cited by examiner

*Primary Examiner* — Chanh D Nguyen
*Assistant Examiner* — Nguyen H Truong
(74) *Attorney, Agent, or Firm* — CANTOR COLBURN LLP

(57) ABSTRACT

A display device may include a display panel which includes pixels, a data driver which provides data voltages corresponding to output image data to the pixels, and a data converter which generates a compensation grayscale from reference compensation values for compensating at least one selected from a color shift and a luminance shift corresponding to a temperature based on an input temperature, an input grayscale included in input image data, and an input luminance, and converts the input image data into the output image data based on the compensation grayscale.

13 Claims, 13 Drawing Sheets

DISPLAY DEVICE AND METHOD OF COMPENSATING IMAGE DATA

This application claims priority to Korean Patent Application No. 10-2022-0027980, filed on Mar. 4, 2022, and all the benefits accruing therefrom under 35 U.S.C. § 119, the content of which in its entirety is herein incorporated by reference.

BACKGROUND

1. Field

Embodiments relate to a display device. More particularly, embodiments related to a display device and a method of compensating image data provided to the display device.

2. Description of the Related Art

A display device may display an image corresponding to image data provided from an outside. The display device may include light emitting elements for displaying the image. Due to ambient temperature of the display device, color shift and/or luminance shift of an image displayed by the display device may occur.

SUMMARY

In a display device where color shift and/or luminance shift of an image displayed by the display device occurs due to ambient temperature change, the magnitude of the color shift and/or the magnitude of the luminance shift of the image may vary according to a grayscale of the image data and a luminance set by a user. When such color shift and/or luminance shift occurs, image quality may be deteriorated.

Embodiments provide a display device that compensates color shift and/or luminance shift of an image.

Embodiments provide a method of compensating image data for compensating color shift and/or luminance shift of an image displayed by a display device.

A display device according to embodiments includes a display panel which includes pixels, a data driver which provides data voltages corresponding to output image data to the pixels, and a data converter which generates a compensation grayscale from reference compensation values for compensating at least one selected from a color shift and a luminance shift corresponding to a temperature based on an input temperature, an input grayscale included in input image data, and an input luminance, and converts the input image data into the output image data based on the compensation grayscale.

In an embodiment, the data converter may include a compensation offset calculator which calculates a compensation offset from first reference compensation values corresponding to reference temperatures and reference grayscales based on the input temperature and the input grayscale, a compensation gain calculator which calculates a compensation gain from second reference compensation values corresponding to reference luminances based on the input luminance, a compensation grayscale calculator which calculates the compensation grayscale based on the compensation offset and the compensation gain, and a data compensator which converts the input image data into the output image data based on the compensation grayscale.

In an embodiment, the compensation offset calculator may include a first lookup table which stores the first reference compensation values, and the compensation offset calculator may calculate first total compensation values corresponding to all temperatures and all grayscales by interpolating the first reference compensation values.

In an embodiment, the compensation gain calculator may include a second lookup table which stores the second reference compensation values, and the compensation gain calculator may calculate second total compensation values corresponding to all luminances by interpolating the second reference compensation values.

In an embodiment, the compensation grayscale calculator may calculate the compensation grayscale by multiplying the compensation offset by the compensation gain.

In an embodiment, the data compensator may generate the output image data by adding the compensation grayscale to the input image data.

In an embodiment, the data converter may further include an input grayscale generator which generates the input grayscale from the input image data.

In an embodiment, the data converter may include a compensation grayscale calculator which calculates the compensation grayscale from reference compensation values corresponding to reference temperatures, reference grayscales, and reference luminances based on the input temperature, the input grayscale, and the input luminance, and a data compensator which converts the input image data into the output image data based on the compensation grayscale.

In an embodiment, the compensation grayscale calculator may include a lookup table which stores the reference compensation values, and the compensation grayscale calculator may calculate total compensation values corresponding to all temperatures, all grayscales, and all luminances by interpolating the reference compensation values.

In an embodiment, the data converter may further include an input grayscale generator which generates the input grayscale from the input image data.

In an embodiment, the input temperature may be provided from a host or measured using a temperature sensor.

In an embodiment, the input luminance may be manually set by a user or automatically set using an illuminance sensor.

A method of compensating image data according to embodiments includes storing reference compensation values for compensating at least one selected from a color shift and a luminance shift corresponding to a temperature, generating a compensation grayscale from the reference compensation values based on an input temperature, an input grayscale included in input image data, and an input luminance, and converting the input image data into output image data based on the compensation grayscale.

In an embodiment, the storing the reference compensation values may include storing first reference compensation values corresponding to reference temperatures and reference grayscales, and storing second reference compensation values corresponding to reference luminances.

In an embodiment, the generating the compensation grayscale may include calculating first total compensation values corresponding to all temperatures and all grayscales by interpolating the first reference compensation values, generating a compensation offset from the first total compensation values based on the input temperature and the input grayscale, calculating second total compensation values corresponding to all luminances by interpolating the second reference compensation values, generating a compensation gain from the second total compensation values based on the input luminance, and calculating the compensation grayscale based on the compensation offset and the compensation gain.

In an embodiment, the calculating the compensation grayscale may include multiplying the compensation offset by the compensation gain.

In an embodiment, the converting the input image data into the output image data may include adding the compensation grayscale to the input image data to generate the output image data.

In an embodiment, the reference compensation values may correspond to reference temperatures, reference grayscales, and reference luminances.

In an embodiment, the generating the compensation grayscale may include calculating total compensation values corresponding to all temperatures, all grayscales, and all luminances by interpolating the reference compensation values, and generating the compensation grayscale from the total compensation values based on the input temperature, the input grayscale, and the input luminance.

In the display device according to the embodiments, the data converter may generate the compensation grayscale from the reference compensation values for compensating the color shift and/or the luminance shift based on the input temperature, the input grayscale, and the input luminance, and may convert the input image data into the output image data based on the compensation grayscale, such that the color shift and/or the luminance shift of the image displayed by the display device may be reduced or effectively prevented.

In the method of compensating image data according to the embodiments, the reference compensation values for compensating the color shift and/or the luminance shift may be stored, the compensation grayscale may be generated from the reference compensation values based on the input temperature, the input grayscale, and the input luminance, and the input image data may be converted into the output image data based on the compensation grayscale, such that the color shift and/or the luminance shift of the image displayed by the display device may be reduced or effectively prevented.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
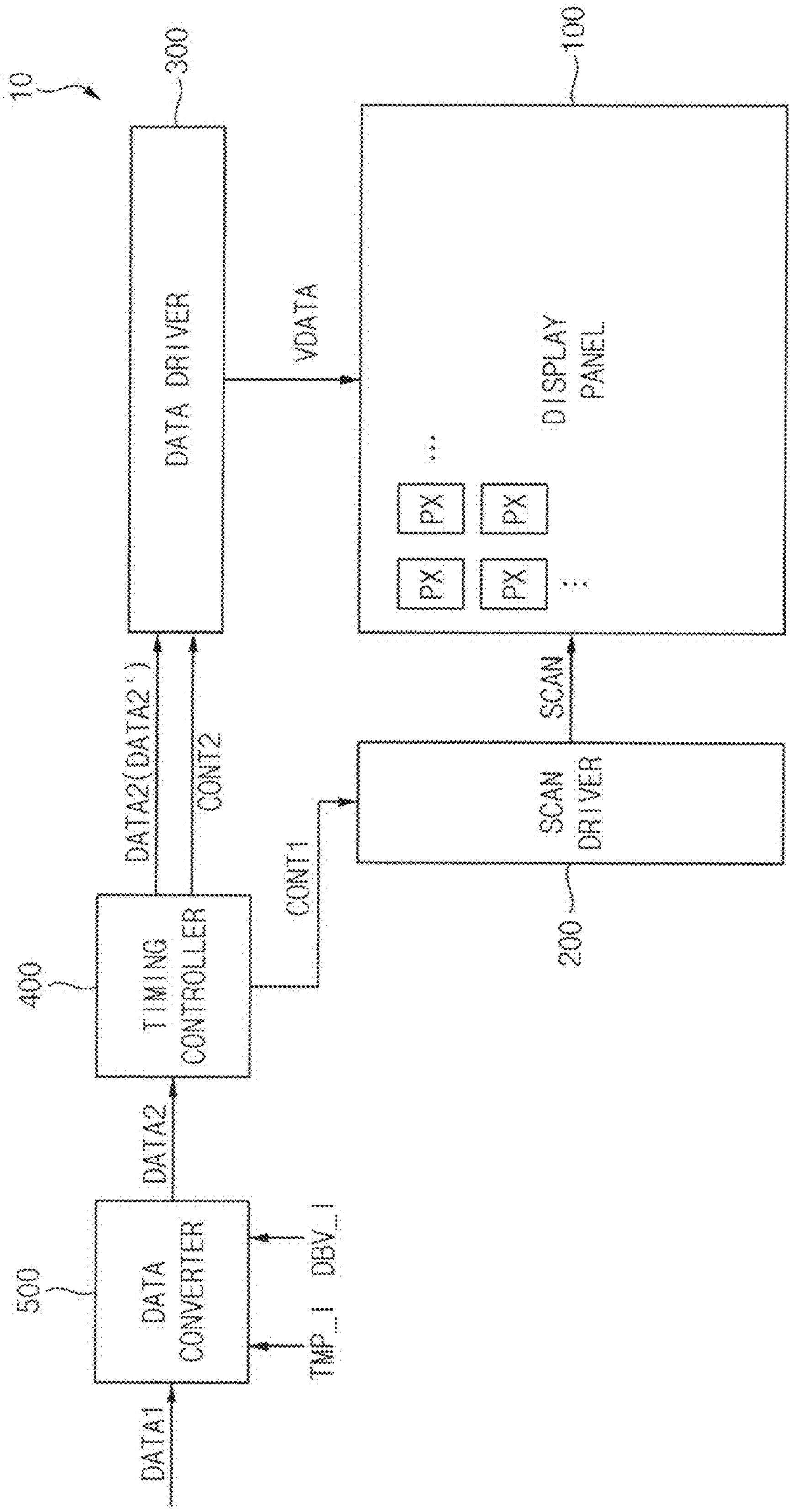
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a display device and a method of compensating image data according to embodiments of the disclosure will be described in detail with reference to the accompanying drawings.

FIG. 1 is a block diagram illustrating a display device 10 according to an embodiment.

Referring to FIG. 1, an embodiment of the display device 10 may include a display panel 100, a scan driver 200, a data driver 300, a timing controller 400, and a data converter 500.

The display panel 100 may include various display elements such as an organic light emitting diode ("OLED") or the like. Hereinafter, embodiments where the display panel 100 includes the organic light emitting diode as a display element will be described for convenience. However, the disclosure is not limited thereto, and alternatively, the display panel 100 may include various display elements such as a liquid crystal display ("LCD") element, an electrophoretic display ("EPD") element, an inorganic light emitting diode, or the like.

The display panel 100 may include a plurality of pixels PX. The pixels PX may receive scan signals SCAN and data voltages VDATA. The pixels PX may emit light based on the scan signals SCAN and the data voltages VDATA.

The scan driver 200 (or a gate driver) may generate the scan signals SCAN (or gate signals) based on a first control signal CONT1 from the timing controller 400, and may provide the scan signals SCAN to the pixels PX. The first control signal CONT1 may include a scan start signal, a scan clock signal, or the like. The scan driver 200 may be implemented as a shift register, but is not limited thereto. In an embodiment, the scan driver 200 may be disposed or formed on the display panel 100. In an alternative embodiment, the scan driver 200 may be implemented as an integrated circuit, and may be mounted on a flexible circuit board to be connected to the display panel 100.

The data driver 300 (or a source driver) may generate the data voltages VDATA based on output image data DATA2 (or compensated output image data DATA2') and a second control signal CONT2 from the timing controller 400, and may provide the data voltages VDATA to the pixels PX. The data voltages VDATA may correspond to the output image data DATA2. The second control signal CONT2 may include a data clock signal, a data enable signal, or the like. In an embodiment, the data driver 300 may be implemented as an integrated circuit, and may be mounted on a flexible circuit board to be connected to the display panel 100.

The timing controller 400 may control a driving of the scan driver 200 and a driving of the data driver 300. The timing controller 400 may generate the output image data DATA2 (or the compensated output image data DATA2'), the first control signal CONT1, and the second control signal CONT2 based on the output image data DATA2 and a control signal from an outside, may provide the first control signal CONT1 to the scan driver 200, and may provide the output image data DATA2 (or the compensated output image data DATA2') and the second control signal CONT2 to the data driver 300. In an embodiment, the output image data DATA2 may include red image data, green image data, and blue image data. The control signal may include a vertical synchronization signal, a horizontal synchronization signal, a clock signal, or the like.

In an embodiment, the timing controller 400 may provide the output image data DATA2 received from the data converter 500 as it is to the data driver 300 without compensating the output image data DATA2. In an alternative embodiment, the timing controller 400 may compensate the output image data DATA2, and may provide the compensated output image data DATA2' to the data driver 300.

FIG. 1 illustrates an embodiment where the timing controller 400 is implemented independently of the data driver 300, however, the disclosure is not limited thereto. In an alternative embodiment, for example, the timing controller 400 may be implemented as a single integrated circuit together with the data driver 300.

The data converter 500 may convert input image data DATA1 into the output image data DATA2, and may provide the output image data DATA2 to the timing controller 400. The data converter 500 may generate a compensation grayscale from reference compensation values for compensating color shift and/or luminance shift according to (or corresponding to) temperature based on an input temperature TMP_I, an input grayscale included in the input image data DATA1, and an input luminance DBV_I, and may convert the input image data DATA1 into the output image data DATA2 based on the compensation grayscale. In an embodiment, the input image data DATA1 may include red image data, green image data, and blue image data.

Configuration and operation of the data converter 500 will be described below with reference to FIGS. 3 to 7.

FIG. 1 illustrates an embodiment where the data converter 500 is implemented independently of the timing controller 400, however, the disclosure is not limited thereto. In an alternative embodiment, for example, the data converter 500 may be implemented as a single integrated circuit together with the timing controller 400.

Figure 2:
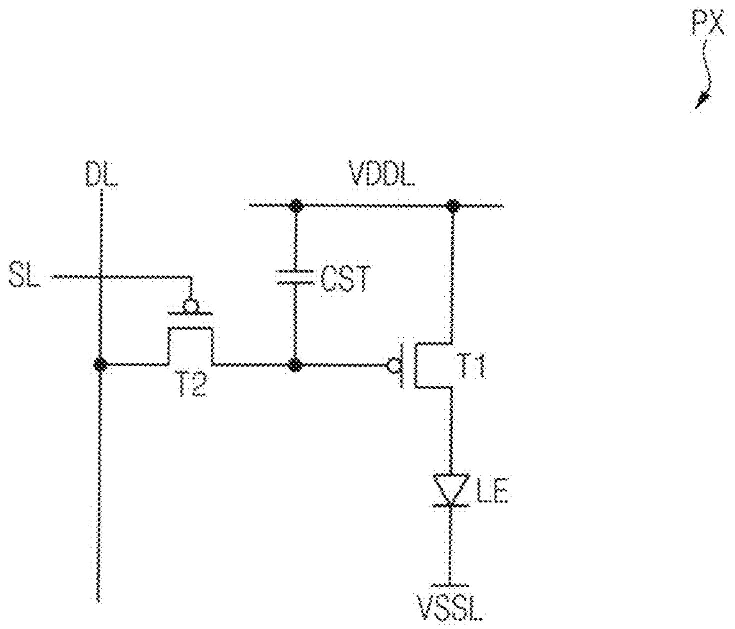
FIG. 2 is a circuit diagram illustrating a pixel included in the display device in FIG. 1.

FIG. 2 is a circuit diagram illustrating the pixel PX included in the display device 10 in FIG. 1.

Referring to FIGS. 1 and 2, the pixel PX may include a first transistor T1, a second transistor T2, a storage capacitor CST, and a light emitting element LE.

The first transistor T1 may provide a driving current to the light emitting element LE. A first electrode of the first transistor T1 may be connected to a first power line VDDL that transmits a first power voltage, and a second electrode of the first transistor T1 may be connected to a first electrode of the light emitting element LE. A gate electrode of the first transistor T1 may be connected to a second electrode of the second transistor T2.

The second transistor T2 may provide the data voltage VDATA to the gate electrode of the first transistor T1 in response to the scan signal SCAN. A first electrode of the second transistor T2 may be connected to a data line DL through which the data voltage VDATA is transmitted, and the second electrode of the second transistor T2 may be connected to the gate electrode of the first transistor T1. A gate electrode of the second transistor T2 may be connected to a scan line SL through which the scan signal SCAN is transmitted.

The storage capacitor CST may maintain a voltage of the gate electrode of the first transistor T1. A first electrode of the storage capacitor CST may be connected to the gate electrode of the first transistor T1, and a second electrode of the storage capacitor CST may be connected to the first power line VDDL.

The light emitting element LE may emit light based on the driving current. The first electrode of the light emitting element LE may be connected to the second electrode of the first transistor T1, and a second electrode of the light emitting element LE may be connected to a second power line VSSL that transmits a second power voltage.

In an embodiment, the light emitting element LE may emit red light, green light, or blue light. In an embodiment where the light emitting element LE emits the red light, the pixel PX may be a red sub-pixel. In an embodiment where the light emitting element LE emits the green light, the pixel PX may be a green sub-pixel. In an embodiment where the light emitting element LE emits the blue light, the pixel PX may be a blue sub-pixel.

In an embodiment, the color shift and/or the luminance shift may occur in the light emitted from the light emitting element LE due to a temperature of the display device 10. In such an embodiment, the magnitude of the color shift and/or the magnitude of the luminance shift may vary according to a grayscale corresponding to the data voltage VDATA and a luminance of the light emitted from the light emitting element LE. Accordingly, in such an embodiment, compensation of the input image data DATA1 may be desired to reduce or substantially prevent the color shift and/or the luminance shift according to the temperature.

Figure 3:
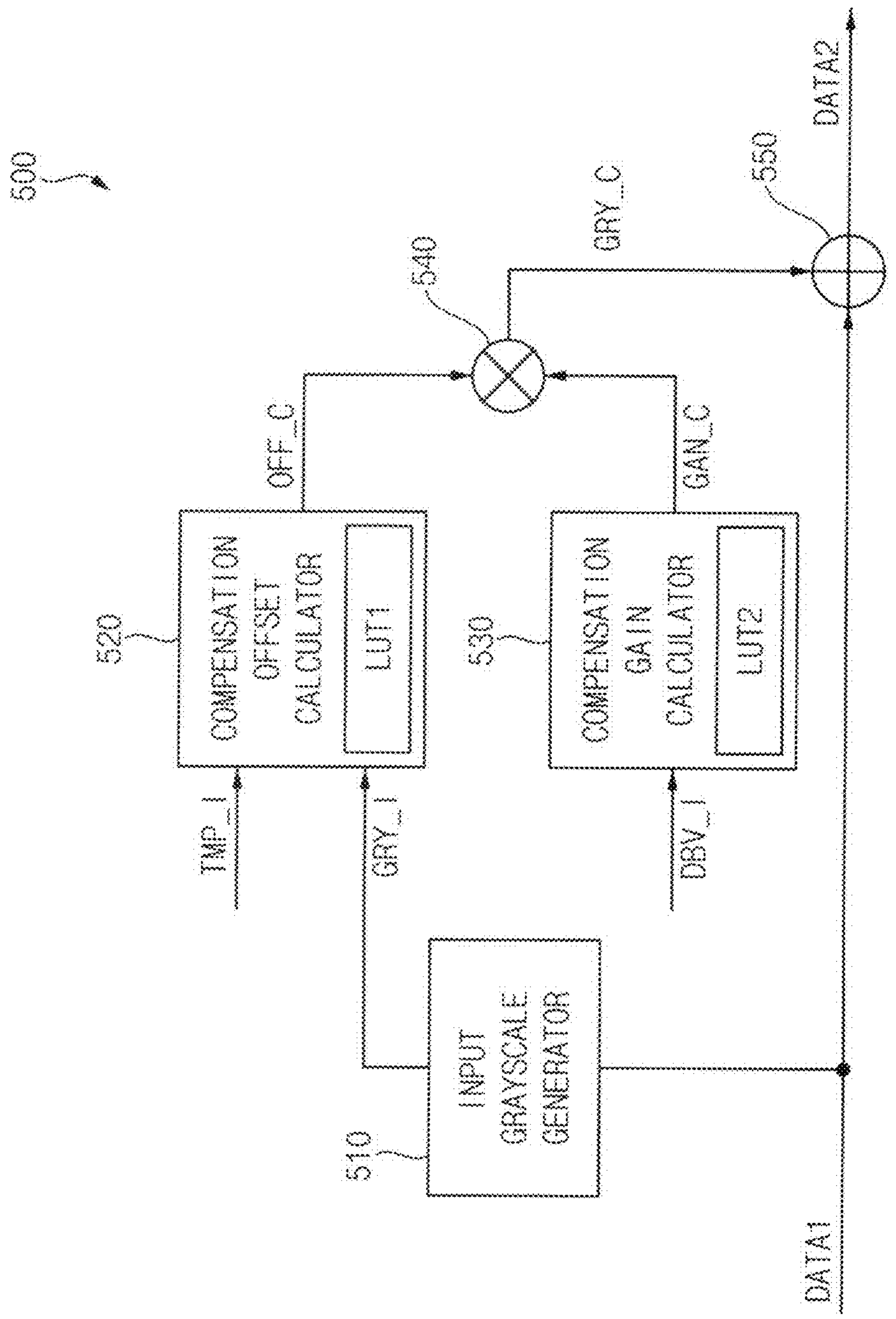
FIG. 3 is a block diagram illustrating a data converter according to an embodiment.
Figure 4:
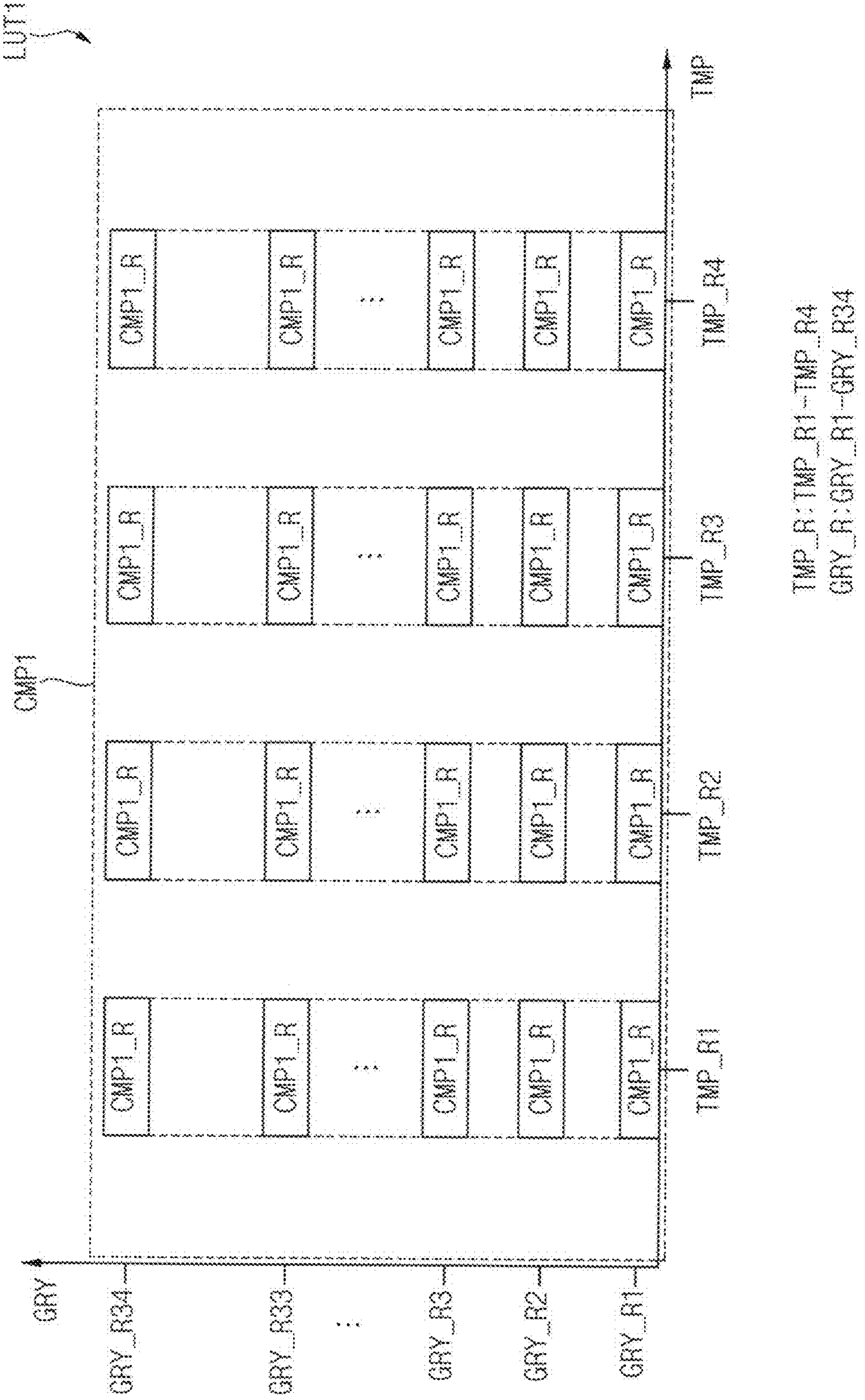
FIG. 4 is a diagram for describing a first lookup table included in the data converter in FIG. 3.
Figure 5:
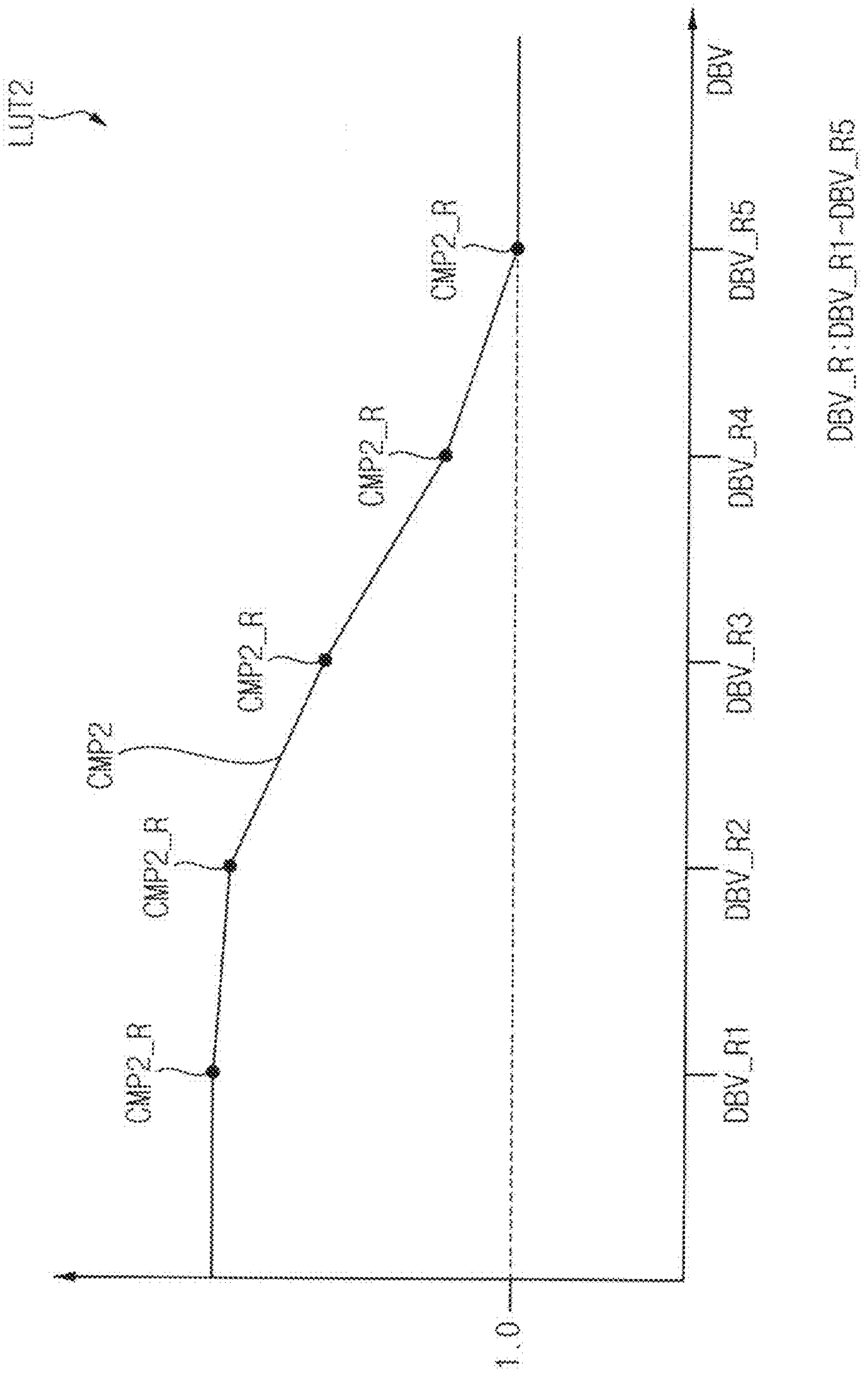
FIG. 5 is a diagram for describing a second lookup table included in the data converter in FIG. 3.

FIG. 3 is a block diagram illustrating a data converter 500 according to an embodiment. FIG. 3 may illustrate an embodiment of the data converter 500 included in the display device 10 in FIG. 1. FIG. 4 is a diagram for describing a first lookup table LUT1 included in the data converter 500 in FIG. 3. FIG. 5 is a diagram for describing a second lookup table LUT2 included in the data converter 500 in FIG. 3.

Referring to FIGS. 3, 4, and 5, an embodiment of the data converter 500 may include an input grayscale generator 510, a compensation offset calculator 520, a compensation gain calculator 530, a compensation grayscale calculator 540, and a data compensator 550.

The input grayscale generator 510 may generate the input grayscale GRY_I from the input image data DATA1.

In an embodiment, the input grayscale generator 510 may generate the input grayscale GRY_I by reducing a data size of the input image data DATA1. In an embodiment, for example, the input image data DATA1 may have a data size of 14 bits for storing a grayscale including a value after a decimal point, and the input grayscale generator 510 may remove the value after the decimal point of the grayscale to generate the input grayscale GRY_I having a data size of 8 bits.

In an alternative embodiment, the input grayscale generator 510 may generate the input grayscale GRY_I that is the same as the input image data DATA1. In such an embodiment, the input grayscale generator 510 may be omitted.

The compensation offset calculator 520 may calculate a compensation offset OFF_C from first reference compensation values CMP1_R corresponding to reference temperatures TMP_R and reference grayscales GRY_R based on the input temperature TMP_I and the input grayscale GRY_I.

The input temperature TMP_I may be provided from a host (e.g., an image processor) that provides the input image data DATA1 to the data converter 500, or may be measured using a temperature sensor attached or adjacent to the display device 10.

The compensation offset calculator 520 may include the first lookup table LUT1 that stores the first reference compensation values CMP1_R corresponding to the reference temperatures TMP_R and the reference grayscales GRY_R. In an embodiment, as shown in FIG. 4, the first lookup table LUT1 may be a two-dimensional lookup table having temperature and grayscale as input values.

The reference temperatures TMP_R may be predetermined temperatures used in a color shift and/or luminance shift measurement. In an embodiment, the reference temperatures TMP_R may include first to fourth reference temperatures TMP_R1-TMP_R4. In an embodiment, for example, the first reference temperature TMP_R1, the second reference temperature TMP_R2, the third reference temperature TMP_R3, and the fourth reference temperature TMP_R4 may be about −10° C., about 10° C., about 25° C., and about 40° C., respectively.

The reference grayscales GRY_R may be predetermined grayscales used in the color shift and/or luminance shift measurement. In an embodiment, the reference grayscales GRY_R may include first to 34th reference grayscales GRY_R1-GRY_R34. In an embodiment, for example, where the input image data DATA1 includes 512 grayscales (0 to 511 grayscales), the first reference grayscale GRY_R1, the second reference grayscale GRY_R2, the third reference grayscale GRY_R3, the $33^{rd}$ reference grayscale GRY_R33, and the 34th reference grayscale GRY_R34 may be 0 grayscale, 8 grayscale, 16 grayscale, 256 grayscale, and 511 grayscale, respectively.

The first reference compensation values CMP1_R may be compensation values for reducing or substantially preventing color shift and/or luminance shift of an image displayed by the display device 10 at the reference temperatures TMP_R and the reference grayscales GRY_R. The first reference compensation values CMP1_R may be obtained based on or derived through the color shift and/or luminance shift measurement at the reference temperatures TMP_R and the reference grayscales GRY_R. The first lookup table LUT1 may be generated by storing the first reference compensation values CMP1_R during a manufacturing process of the display device 10, and may be updated by storing the first reference compensation values CMP1_R during a using process of the display device 10.

The compensation offset calculator 520 may calculate first total compensation values CMP1 corresponding to all temperatures TMP (or any temperatures in a predetermined range) and all grayscales GRY (or any grayscales in a predetermined range) by interpolating the first reference compensation values CMP1_R.

First compensation values corresponding to temperatures other than the reference temperatures TMP_R among all temperatures TMP and grayscales other than the reference grayscales GRY_R among all grayscales GRY may be calculated by interpolating the first reference compensation values CMP1_R. In an embodiment, for example, first compensation values corresponding to temperatures between the first to fourth reference temperatures TMP_R1-TMP_R4 and grayscales between the first to 34th reference grayscales GRY_R1-GRY_R34 may be calculated by linearly interpolating the first reference compensation values CMP1_R. In such an embodiment, first compensation values corresponding to temperatures lower than the first reference temperature TMP_R1 may be calculated as the same values as the first reference compensation values CMP1_R corresponding to the first reference temperature TMP_R1, and first compensation values corresponding to temperatures higher than the fourth reference temperature TMP_R4 may be calculated as the same values as the first reference compensation values CMP1_R corresponding to the fourth reference temperature TMP_R4.

In a case where the first total compensation values CMP1 corresponding to all temperatures TMP and all grayscales GRY are stored in the first lookup table LUT1, the size of the first lookup table LUT1 may increase, and accordingly, the size of the memory may increase or the size of the integrated circuit in which the data converter 500 is implemented may increase. In an embodiment, only the first reference compensation values CMP1_R corresponding to the reference temperatures TMP_R and the reference grayscales GRY_R may be stored in the first lookup table LUT1, and the first total compensation values CMP1 corresponding to all temperatures TMP and all grayscales GRY may be calculated by interpolating the first reference compensation values CMP1_R, such that the size of the first lookup table LUT1 may be reduced.

The compensation offset calculator 520 may output a first compensation value corresponding to the input temperature TMP_I and the input grayscale GRY_I among the first total compensation values CMP1 corresponding to all temperatures TMP and all grayscales GRY as the compensation offset OFF_C.

The compensation gain calculator 530 may calculate a compensation gain GAN_C from second reference compensation values CMP2_R corresponding to reference luminances DBV_R based on the input luminance DBV_I.

The input luminance DBV_I may be manually set by a user of the display device 10, or may be automatically set using an illuminance sensor attached or adjacent to the display device 10. The input luminance DBV_I may be a luminance corresponding to a maximum grayscale among grayscales. In an embodiment, for example, where the input image data DATA1 includes 512 grayscales (0 grayscale to 511 grayscale), the input luminance DBV_I may be a luminance corresponding to 511 grayscale.

The compensation gain calculator 530 may include a second lookup table LUT2 that stores the second reference compensation values CMP2_R corresponding to the reference luminances DBV_R. In an embodiment, as shown in FIG. 5, the second lookup table LUT2 may be a one-dimensional lookup table having luminance as an input value.

The reference luminances DBV_R may be predetermined luminances used in the color shift and/or luminance shift measurement. In an embodiment, the reference luminances DBV_R may include first to fifth reference luminances DBV_R1-DBV_R5. In an embodiment, for example, the first reference luminance DBV_R1, the second reference luminance DBV_R2, the third reference luminance DBV_R3, and the fourth reference luminance DBV_R4 may be about 10 nits (or cd/$m^2$), about 30 nits, about 60 nits, and about 100 nits, respectively. In such an embodiment, the fifth reference luminance DBV_R5 may be greater than the fourth reference luminance DBV_R4, and may be a minimum luminance at which the color shift and/or luminance shift does not occur.

The second reference compensation values CMP2_R may be compensation values for reducing or substantially preventing color shift and/or a luminance shift of an image displayed by the display device 10 at the reference luminances DBV_R. The second reference compensation values CMP2_R may be obtained based on or derived through the color shift and/or luminance shift measurement at the reference luminances DBV_R. The second lookup table LUT2 may be generated by storing the second reference compensation values CMP2_R during the manufacturing process of the display device 10, and may be updated by storing the second reference compensation values CMP2_R during the using process of the display device 10.

The compensation gain calculator 530 may calculate second total compensation values CMP2 corresponding to all luminances DBV (or any luminances in a predetermined range) by interpolating the second reference compensation values CMP2_R.

Second compensation values corresponding to luminances other than the reference luminances DBV_R among all luminances DBV may be calculated by interpolating the second reference compensation values CMP2_R. In an embodiment, for example, second compensation values corresponding to luminances between the first to fifth reference luminances DBV_R1-DBV_R5 may be calculated by linearly interpolating the second reference compensation values CMP2_R. In such an embodiment, second compensation values corresponding to luminances lower than the first reference luminance DBV_R1 may be calculated as the same values as the second reference compensation value CMP2_R corresponding to the first reference luminance DBV_R1, and second compensation values corresponding to luminances higher than the fifth reference luminance DBV_R5 may be calculated as the same value (e.g., 1.0) as the second reference compensation value CMP2_R corresponding to the fifth reference luminance DBV_R5.

In a case where the second total compensation values CMP2 corresponding to all luminances DBV are stored in the second lookup table LUT2, the size of the second lookup table LUT2 may increase, and accordingly, the size of the memory may increase, or the size of the integrated circuit in which the data converter 500 is implemented may increase. In an embodiment, only the second reference compensation values CMP2_R corresponding to the reference luminances DBV_R may be stored in the second lookup table LUT2, and the second total compensation values CMP2 corresponding to all the luminances DBV may be calculated by interpolating the second reference compensation values CMP2_R, such that the size of the second lookup table LUT2 may be reduced.

Referring back to FIG. 3, the compensation gain calculator 530 may output a second compensation value corresponding to the input luminance DBV_I among the second total compensation values CMP2 corresponding to all luminances DBV as the compensation gain GAN_C.

The compensation grayscale calculator 540 may calculate the compensation grayscale GRY_C based on the compensation offset OFF_C and the compensation gain GAN_C.

In an embodiment, the compensation grayscale calculator 540 may calculate the compensation grayscale GRY_C by multiplying the compensation offset OFF_C by the compensation gain GAN_C. In an embodiment, for example, the compensation grayscale calculator 540 may be a multiplier.

The data compensator 550 may convert the input image data DATA1 into the output image data DATA2 based on the compensation grayscale GRY_C.

In an embodiment, the data compensator 550 may generate the output image data DATA2 by adding the compensation grayscale GRY_C to the input image data DATA1. In an embodiment, for example, the data compensator 550 may be an adder.

Figure 6:
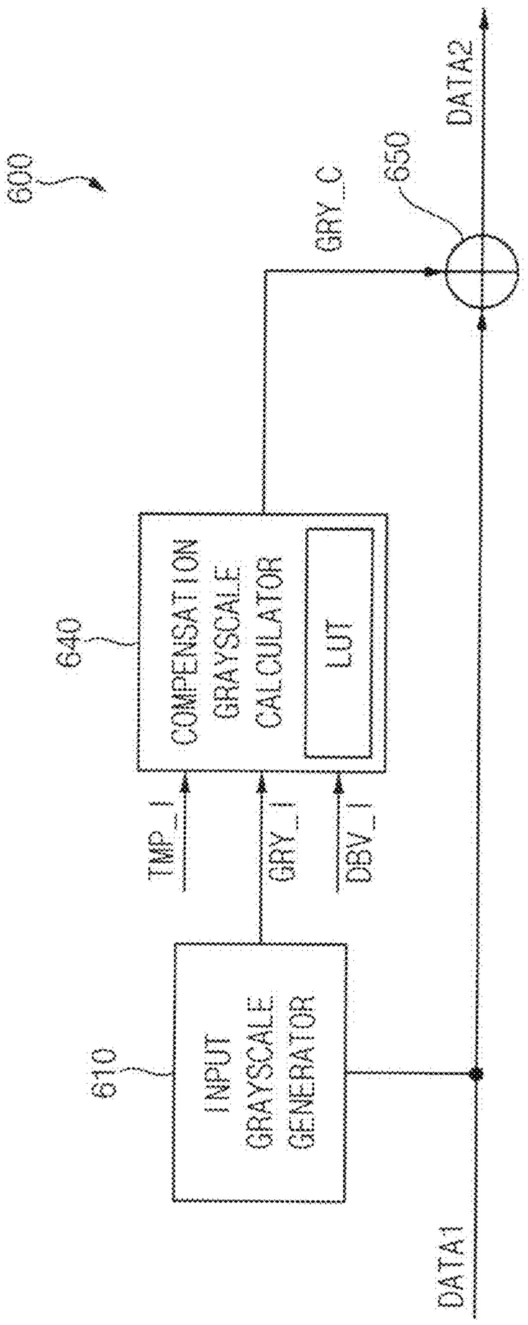
FIG. 6 is a block diagram illustrating a data converter according to an embodiment.
Figure 7:
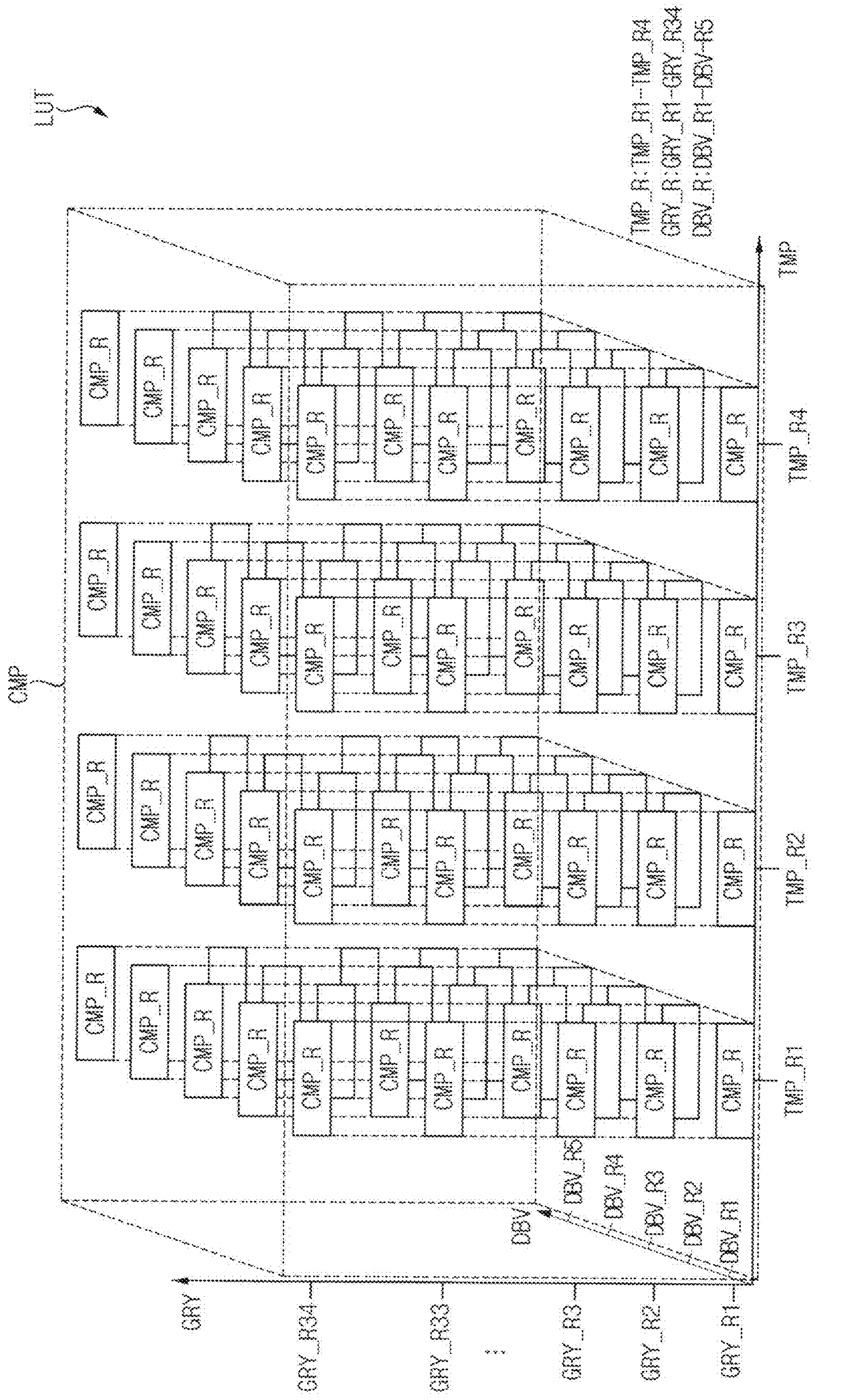
FIG. 7 is a diagram for describing a lookup table included in the data converter in FIG. 6.

FIG. 6 is a block diagram illustrating a data converter 600 according to an embodiment. FIG. 6 may illustrate an alternative embodiment of the data converter 500 included in the display device 10 in FIG. 1. FIG. 7 is a diagram for describing a lookup table LUT included in the data converter 600 in FIG. 6.

Hereinafter, any repetitive detailed description of components of the data converter 600 shown in FIGS. 6 and 7, which are substantially the same as or similar to those of the data converter 500 described above with reference to FIGS. 3 to 5, will be omitted or simplified.

Referring to FIGS. 6 and 7, an embodiment of the data converter 600 may include an input grayscale generator 610, a compensation grayscale calculator 640, and a data compensator 650.

The input grayscale generator 610 may generate the input grayscale GRY_I from the input image data DATA1.

In an embodiment, the input grayscale generator 610 may reduce a data size of the input image data DATA1 to generate the input grayscale GRY_I. In an alternative embodiment, the input grayscale generator 610 may generate the same input grayscale GRY_I as the input image data DATA1. In such an embodiment, the input grayscale generator 610 may be omitted.

The compensation grayscale calculator 640 may calculate a compensation grayscale GRY_C from reference compensation values CMP_R corresponding to reference temperatures TMP_R, reference grayscales GRY_R, and reference luminances DBV_R based on the input temperature TMP_I, the input grayscale GRY_I, and the input luminance DBV_I.

The input temperature TMP_I may be provided from a host (e.g., an image processor) that provides the input image data DATA1 to the data converter 600, or may be measured using a temperature sensor attached or adjacent to the display device 10.

The input luminance DBV_I may be manually set by a user of the display device 10, or may be automatically set using an illuminance sensor attached to the display device 10. The input luminance DBV_I may be a luminance corresponding to a maximum grayscale among grayscales.

The compensation grayscale calculator 640 may include a lookup table LUT that stores the reference compensation values CMP_R corresponding to the reference temperatures TMP_R, the reference grayscales GRY_R, and the reference luminances DBV_R. In an embodiment, as shown in FIG. 7, the lookup table LUT may be a three-dimensional lookup table having temperature, grayscale, and luminance as input values.

The reference temperatures TMP_R may be predetermined temperatures used in a color shift and/or luminance shift measurement. In an embodiment, the reference temperatures TMP_R may include first to fourth reference temperatures TMP_R1-TMP_R4.

The reference grayscales GRY_R may be predetermined grayscales used in the color shift and/or luminance shift measurement. In an embodiment, the reference grayscales GRY_R may include first to 34th reference grayscales GRY_R1-GRY_R34.

The reference luminances DBV_R may be predetermined luminances used in the color shift and/or luminance shift measurement. In an embodiment, the reference luminances DBV_R may include first to fifth reference luminances DBV_R1-DBV_R5.

The reference compensation values CMP_R may be compensation values for reducing or substantially preventing color shift and/or luminance shift of an image displayed by the display device 10 at the reference temperatures TMP_R, the reference grayscales GRY_R, and the reference luminances DBV_R. The reference compensation values CMP_R may be obtained based on or derived through the color shift and/or luminance shift measurement at the reference temperatures TMP_R, the reference grayscales GRY_R, and the reference luminances DBV_R. The lookup table LUT may be generated by storing the reference compensation values CMP_R during a manufacturing process of the display device 10, and may be updated by storing the reference compensation values CMP_R in a using process of the display device 10.

The compensation grayscale calculator 640 may interpolate the reference compensation values CMP_R to calculate total compensation values CMP corresponding to all temperatures TMP, all grayscales GRY, and all luminances DBV.

Compensation values corresponding to temperatures other than the reference temperatures TMP_R among all temperatures TMP, grayscales other than the reference grayscales GRY_R among all grayscales GRY, and luminances other than the reference luminances DBV_R among all luminances DBV may be calculated by interpolating the reference compensation values CMP_R.

In a case where the total compensation values CMP corresponding to all temperatures TMP, all grayscales GRY, and all luminances DBV are stored in the lookup table LUT, the size of the lookup table LUT may increase, and accordingly, the size of the memory may increase or the size of the integrated circuit in which the data converter 500 is implemented may increase. In an embodiment, only the reference compensation values CMP_R corresponding to the reference temperatures TMP_R, the reference grayscales GRY_R, and the reference luminances DBV_R may be stored in the lookup table LUT, and the total compensation values CMP corresponding to all temperatures TMP, all grayscales GRY, and all luminances DBV may be calculated by interpolating the reference compensation values CMP_R, such that the size of the lookup table LUT may be reduced.

The compensation grayscale calculator 640 may output a compensation value corresponding to the input temperature TMP_I, the input grayscale GRY_I, and the input luminance DBV_I among the total compensation values CMP corresponding to all temperatures TMP, all grayscales GRY, and all luminances DBV as the compensation grayscale GRY_C.

The data compensator 650 may convert the input image data DATA1 into the output image data DATA2 based on the compensation grayscale GRY_C.

In an embodiment, the data compensator 650 may generate the output image data DATA2 by adding the compensation grayscale GRY_C to the input image data DATA1. In an embodiment, for example, the data compensator 650 may be an adder.

Figure 8:
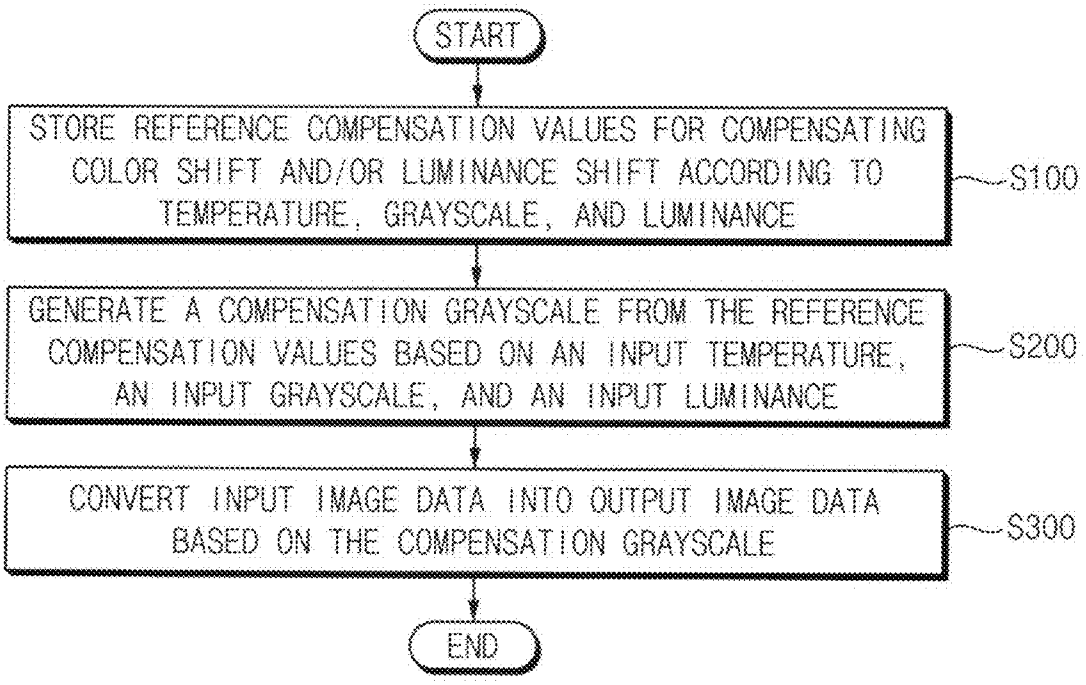
FIG. 8 is a flowchart illustrating a method of compensating image data according to an embodiment.
Figure 9:
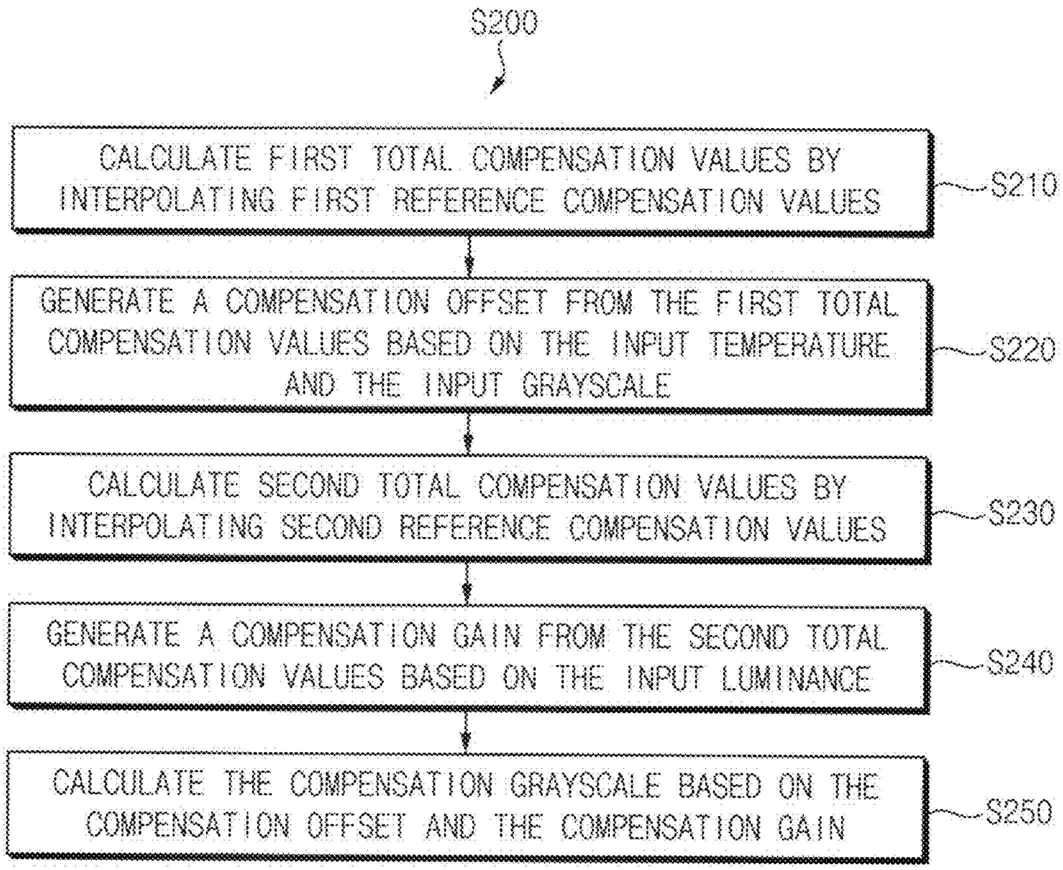
FIG. 9 is a flowchart illustrating an embodiment of generating a compensation grayscale included in the method of compensating the image data in FIG. 8.

FIG. 8 is a flowchart illustrating a method of compensating image data according to an embodiment. FIG. 9 is a flowchart illustrating an embodiment of generating a compensation grayscale included in the method of compensating the image data in FIG. 8.

The method of compensating the image data of FIGS. 8 and 9 may be performed using the data converter 500 described above with reference to FIGS. 3 to 5.

Referring to FIGS. 3 to 5, 8, and 9, first, reference compensation values for compensating color shift and/or luminance shift according to (or corresponding to) temperature, grayscale, and luminance may be stored (S100). The reference compensation values may include first reference compensation values CMP1_R corresponding to reference temperatures TMP_R and reference grayscales GRY_R, and second reference compensation values CMP2_R corresponding to reference luminances TMP_R.

The first reference compensation values CMP1_R may be obtained based on or derived through a color shift and/or luminance shift measurement at the reference temperatures TMP_R and the reference grayscales GRY_R. The first reference compensation values CMP1_R may be stored in a first lookup table LUT1 during a manufacturing process of the display device 10 or a using process of the display device 10.

The second reference compensation values CMP2_R may be obtained based on or derived through the color shift and/or luminance shift measurement at the reference luminances DBV_R. The second reference compensation values CMP2_R may be stored in a second lookup table LUT2 during the manufacturing process of the display device 10 or the using process of the display device 10.

After storing the reference compensation values (S100), a compensation grayscale GRY_C may be generated from the reference compensation values including the first reference compensation values CMP1_R and the second reference compensation values CMP2_R based on an input temperature TMP_I, an input grayscale GRY_I included in input image data DATA1, and an input luminance DBV_I (S200).

In order to generate the compensation grayscale GRY_C, as shown in FIG. 9, first, first total compensation values CMP1 corresponding to all temperatures TMP and all grayscales GRY may be calculated by interpolating the first reference compensation values CMP1_R (S210). First compensation values corresponding to temperatures between the reference temperatures TMP_R and grayscales between the reference grayscales GRY_R may be calculated by linearly interpolating the first reference compensation values CMP1_R.

Then, a compensation offset OFF_C may be generated from the first total compensation values CMP1 based on the input temperature TMP_I and the input grayscale GRY_I (S220). A first compensation value corresponding to the input temperature TMP_I and the input grayscale GRY_I among the first total compensation values CMP1 may be determined as the compensation offset OFF_C.

Then, second total compensation values CMP2 corresponding to all luminances DBV may be calculated by interpolating the second reference compensation values CMP2_R (S230). Second compensation values corresponding to luminances between the reference luminances DBV_R may be calculated by linearly interpolating the second reference compensation values CMP2_R.

Then, a compensation gain GAN_C may be generated from the second total compensation values CMP2 based on the input luminance DBV_I (S240). A second compensation value corresponding to the input luminance DBV_I among the second total compensation values CMP2 may be determined as the compensation gain GAN_C.

Then, the compensation grayscale GRY_C may be calculated based on the compensation offset OFF_C and the compensation gain GAN_C (S250). In an embodiment, the compensation grayscale GRY_C may be calculated by multiplying the compensation offset OFF_C by the compensation gain GAN_C.

After generating the compensation grayscale GRY_C (S200), the input image data DATA1 may be converted into output image data DATA2 based on the compensation grayscale GRY_C (S300). In an embodiment, the output image data DATA2 may be generated by adding the compensation grayscale GRY_C to the input image data DATA1.

Figure 10:
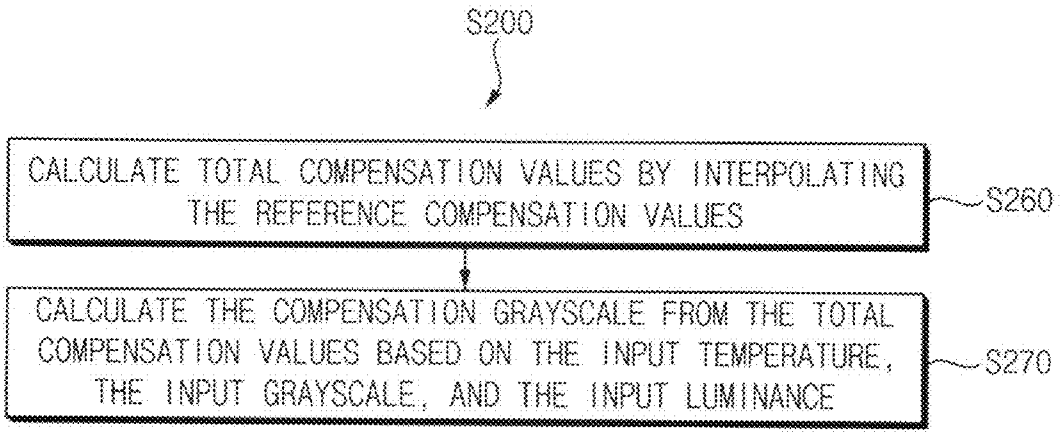
FIG. 10 is a flowchart illustrating an alternative embodiment of generating a compensation grayscale included in the method of compensating the image data in FIG. 8.

FIG. 10 is a flowchart illustrating an alternative embodiment of generating a compensation grayscale included in the method of compensating the image data in FIG. 8.

The method of compensating the image data of FIGS. 8 and 10 may be performed using the data converter 600 described with reference to FIGS. 6 and 7.

Referring to FIGS. 6 to 8 and 10, first, reference compensation values CMP_R for compensating color shift and/or luminance shift according to temperature, grayscale, and luminance may be stored (S100). The reference compensation values CMP_R may correspond to reference temperatures TMP_R, reference grayscales GRY_R, and reference luminances TMP_R.

The reference compensation values CMP_R may be obtained based on or derived through a color shift and/or luminance shift measurement at the reference temperatures TMP_R, the reference grayscales GRY_R, and the reference luminances DBV_R. The reference compensation values CMP_R may be stored in the lookup table LUT during a manufacturing process of the display device 10 or a using process of the display device 10.

After storing the reference compensation values CMP_R (S100), a compensation grayscale GRY_C may be generated from the reference compensation values CMP_R based on an input temperature TMP_I, an input grayscale GRY_I included in input image data DATA1, and an input luminance DBV_I (S200).

In order to generate the compensation grayscale GRY_C, as shown in FIG. 10, first, total compensation values CMP corresponding to all temperatures TMP, all grayscales GRY, and all luminances DBV may be calculated by interpolating the reference compensation values CMP_R (S260). Compensation values corresponding to temperatures between the reference temperatures TMP_R, grayscales between the reference grayscales GRY_R, and luminances between the reference luminances DBV_R may be calculated by linearly interpolating the reference compensation values CMP_R.

Then, the compensation grayscale GRY_C may be generated from the total compensation values CMP based on the input temperature TMP_I, the input grayscale GRY_I, and the input luminance DBV_I (S270). A compensation value corresponding to the input temperature TMP_I, the input grayscale GRY_I, and the input luminance DBV_I among the total compensation values CMP may be determined as the compensation grayscale GRY_C.

After generating the compensation grayscale GRY_C (S200), the input image data DATA1 may be converted into output image data DATA2 based on the compensation grayscale GRY_C (S300). In an embodiment, the output image data DATA2 may be generated by adding the compensation grayscale GRY_C to the input image data DATA1.

Figure 11:
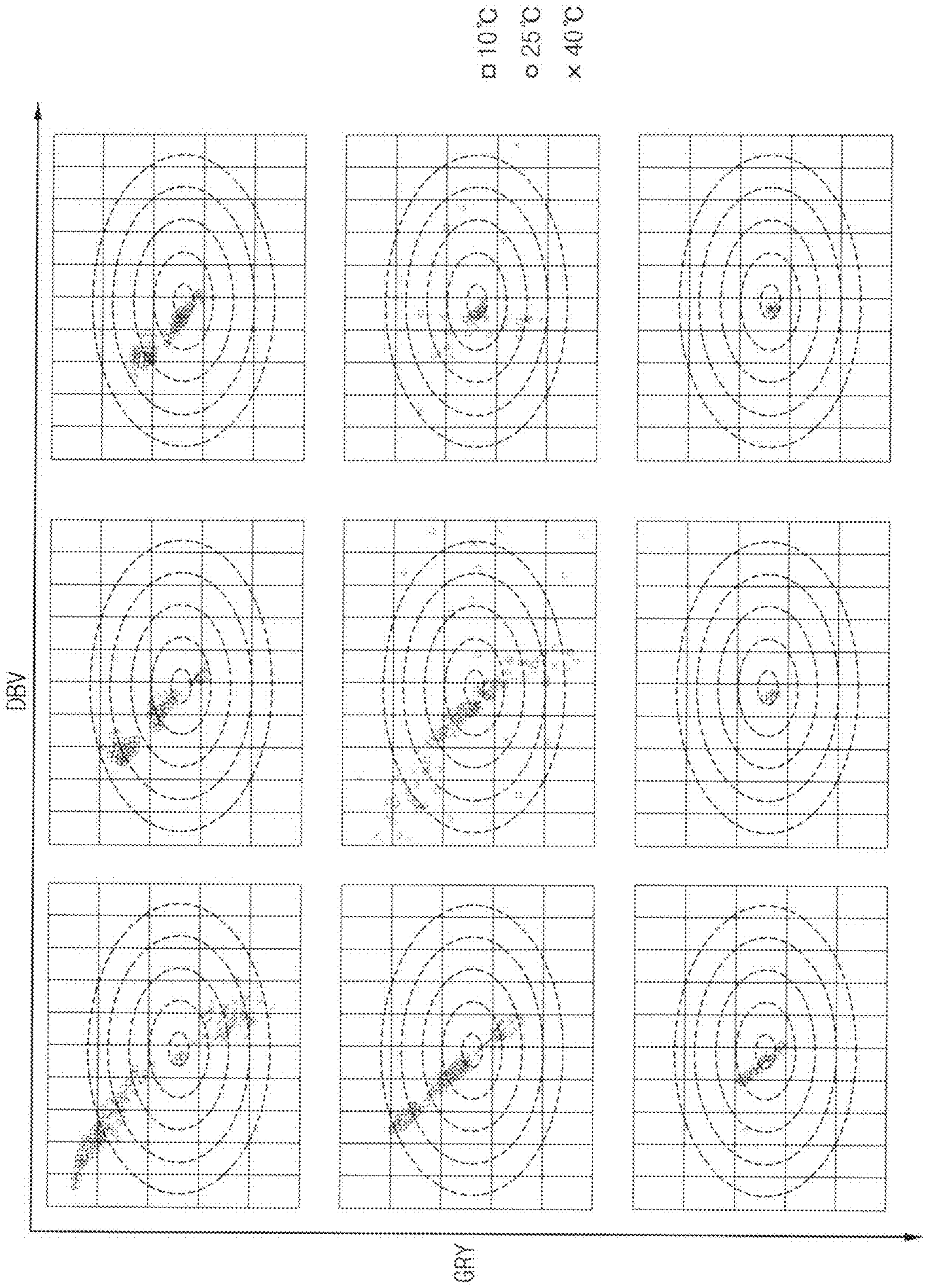
FIG. 11 is a diagram illustrating distribution of colors according to temperature before compensating image data according to embodiments.
Figure 12:
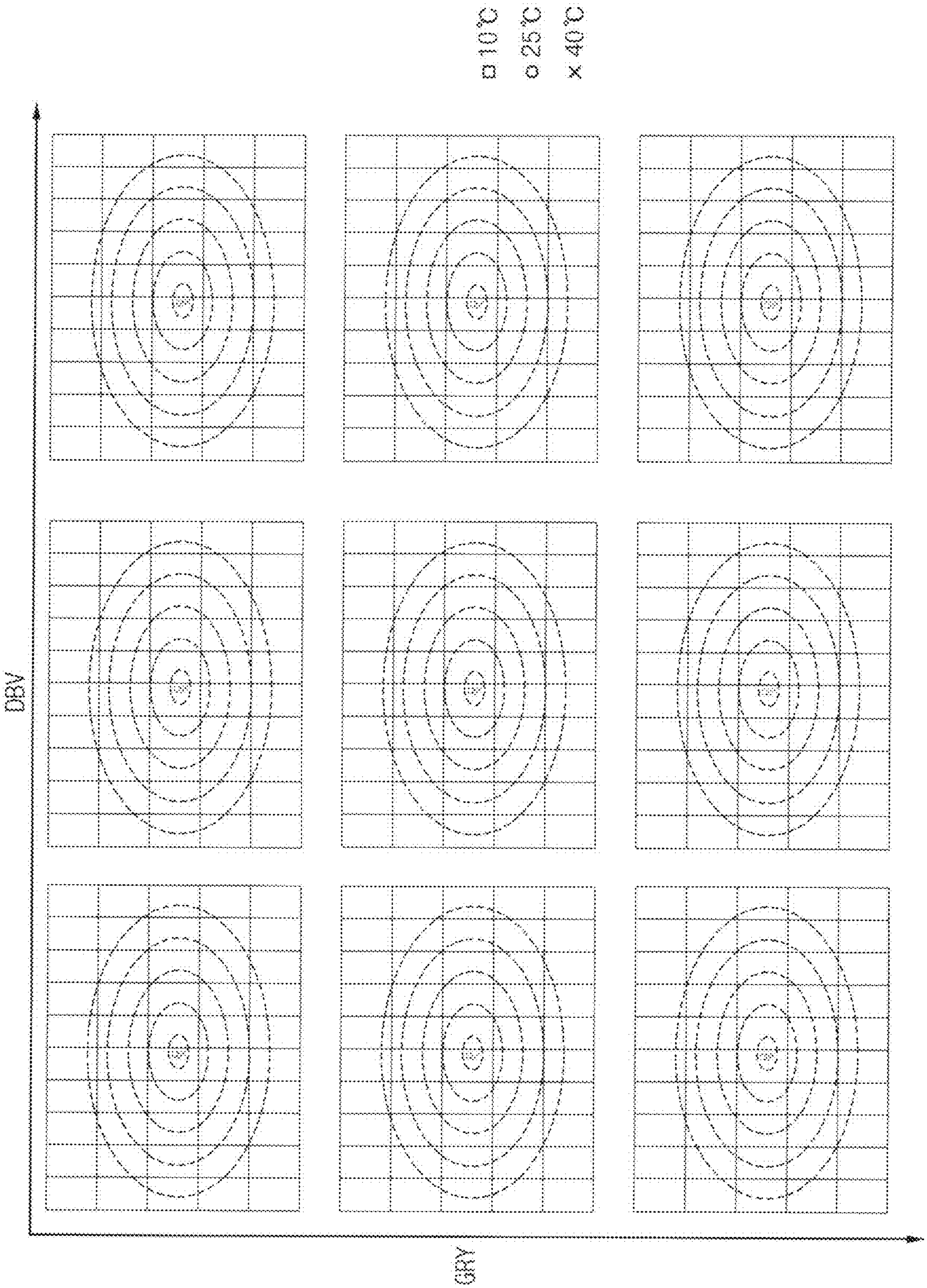
FIG. 12 is a diagram illustrating distribution of colors according to temperature after compensating image data according to embodiments.

FIG. 11 is a diagram illustrating distribution of colors according to temperature before compensating image data according to embodiments. FIG. 12 is a diagram illustrating distribution of colors according to temperature after compensating image data according to embodiments.

Referring to FIG. 11, a color shift may occur in an image corresponding to the image data before compensating the image data according to the embodiments. The color shift of the image may occur according to the temperature, and the magnitude of the color shift may vary according to grayscale and luminance. In an embodiment, for example, as the grayscale decreases or the luminance decreases, the colors of the image may deviate more from a center of a color coordinate.

Referring to FIG. 12, the color shift may be reduced or may not substantially occur in the image corresponding to the image data after compensating the image data according to the embodiments. Reference compensation values for compensating color shift may be stored, a compensation grayscale may be generated from the reference compensation values based on input temperature, input grayscale, and input luminance, and input image data may be converted into output image data based on the compensation grayscale, so that a color shift of an image corresponding to the output image data may be reduced or effectively prevented.

Figure 13:
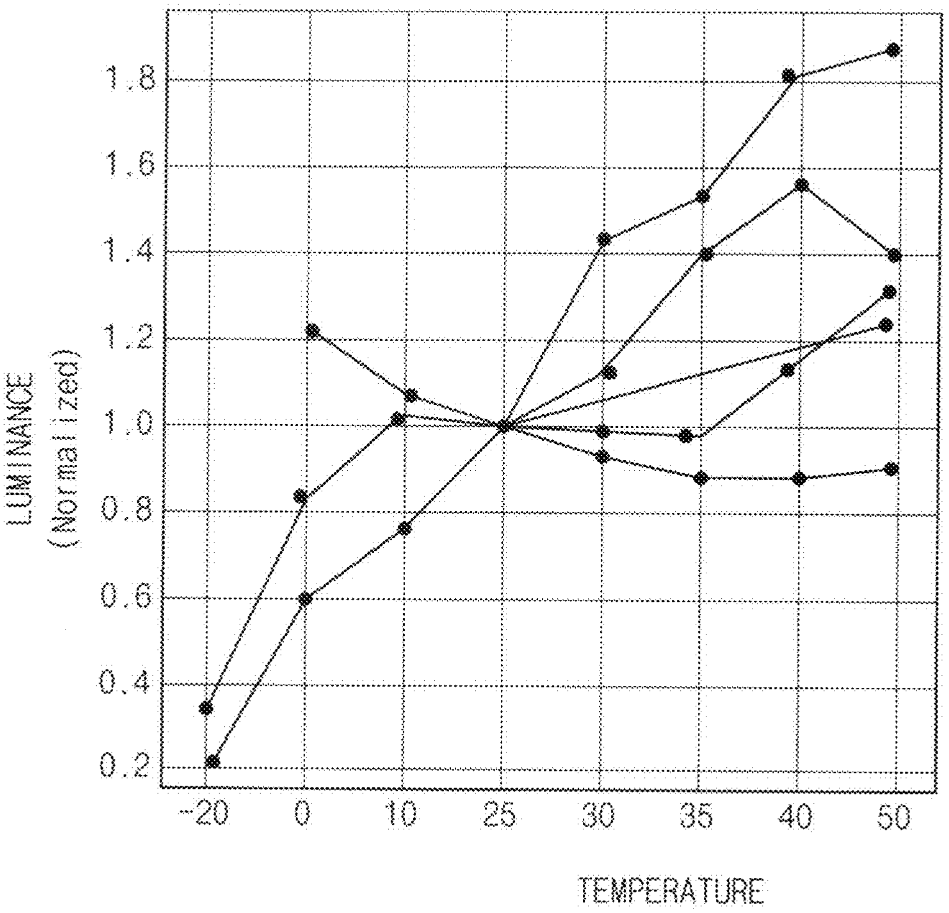
FIG. 13 is a diagram illustrating luminance according to temperature before compensating image data according to embodiments.
Figure 14:
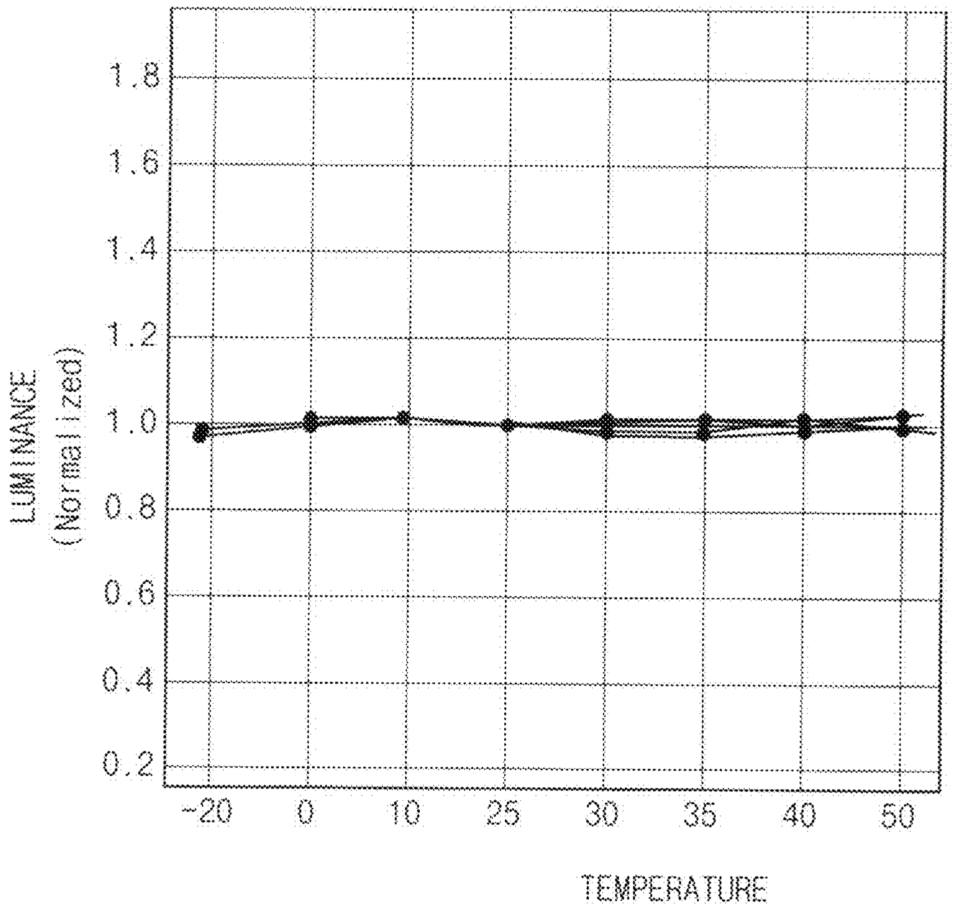
FIG. 14 is a diagram illustrating luminance according to temperature after compensating image data according to embodiments.

FIG. 13 is a diagram illustrating luminance according to temperature before compensating image data according to embodiments. FIG. 14 is a diagram illustrating luminance according to temperature after compensating image data according to embodiments.

Referring to FIG. 13, a luminance shift may occur in an image corresponding to the image data before compensating the image data according to the embodiments. The luminance shift of the image may occur according to the temperature, and the magnitude of the luminance shift may vary according to grayscale and luminance.

Referring to FIG. 14, the luminance shift may be reduced or may not substantially occur in the image corresponding to the image data after compensating the image data according to the embodiments. Reference compensation values for compensating luminance shift may be stored, a compensation grayscale may be generated from the reference compensation values based on input temperature, input grayscale, and input luminance, and input image data may be converted into output image data based on the compensation grayscale, so that a luminance shift of an image corresponding to the output image data may be reduced or effectively prevented.

The display device according to the embodiments may be applied to a display device included in a computer, a notebook, a mobile phone, a smart phone, a smart pad, a personal media player ("PMP"), a personal digital assistance ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a display panel that includes pixels;

a data driver which provides data voltages corresponding to output image data to the pixels; and a data converter which generates a compensation grayscale from reference compensation values for compensating at least one selected from a color shift and a luminance shift corresponding to a temperature based on an input temperature, an input grayscale included in input image data, and an input luminance, and converts the input image data into the output image data based on the compensation grayscale, wherein the input luminance is a luminance corresponding to a maximum grayscale of the input image data, and wherein the data converter includes:

a compensation offset calculator which calculates a compensation offset from first reference compensation values corresponding to reference temperatures and reference grayscales based on the input temperature and the input grayscale;

a compensation gain calculator which calculates a compensation gain from second reference compensation values corresponding to reference luminances based on the input luminance;

a compensation grayscale calculator which calculates the compensation grayscale based on the compensation offset and the compensation gain; and a data compensator which converts the input image data into the output image data based on the compensation grayscale.

2. The display device of claim 1, wherein the compensation offset calculator includes a first lookup table which stores the first reference compensation values, and wherein the compensation offset calculator calculates first total compensation values corresponding to all temperatures and all grayscales by interpolating the first reference compensation values.

3. The display device of claim 1, wherein the compensation gain calculator includes a second lookup table which stores the second reference compensation values, and wherein the compensation gain calculator calculates second total compensation values corresponding to all luminances by interpolating the second reference compensation values.

4. The display device of claim 1, wherein the compensation grayscale calculator calculates the compensation grayscale by multiplying the compensation offset by the compensation gain.

5. The display device of claim 1, wherein the data compensator generates the output image data by adding the compensation grayscale to the input image data.

6. The display device of claim 1, wherein the data converter further includes an input grayscale generator which generates the input grayscale from the input image data.

7. The display device of claim 1, wherein the input temperature is provided from a host or measured using a temperature sensor.

8. The display device of claim 1, wherein the input luminance is manually set by a user or automatically set using an illuminance sensor.

9. A method of compensating image data, the method comprising:

storing reference compensation values for compensating at least one selected from a color shift and a luminance shift corresponding to a temperature;

generating a compensation grayscale from the reference compensation values based on an input temperature, an input grayscale included in input image data, and an input luminance; and converting the input image data into output image data based on the compensation grayscale, wherein the input luminance is a luminance corresponding to a maximum grayscale of the input image data, and wherein the generating the compensation grayscale includes:

calculating first total compensation values corresponding to all temperatures and all grayscales by interpolating the first reference compensation values;

generating a compensation offset from the first total compensation values based on the input temperature and the input grayscale;

calculating second total compensation values corresponding to all luminances by interpolating the second reference compensation values;

generating a compensation gain from the second total compensation values based on the input luminance; and calculating the compensation grayscale based on the compensation offset and the compensation gain.

10. The method of claim 9, wherein the storing the reference compensation values includes:

storing first reference compensation values corresponding to reference temperatures and reference grayscales; and storing second reference compensation values corresponding to reference luminances.

11. The method of claim 9, wherein the calculating the compensation grayscale includes multiplying the compensation offset by the compensation gain.

12. The method of claim 9, wherein the converting the input image data into the output image data includes adding the compensation grayscale to the input image data to generate the output image data.

13. The method of claim 9, wherein the reference compensation values correspond to reference temperatures, reference grayscales, and reference luminances.

* * * * *